United States Patent
Chen et al.

(10) Patent No.: US 12,026,569 B2
(45) Date of Patent: Jul. 2, 2024

(54) DISPLAY METHOD OF ELECTRONIC IDENTIFICATION DEVICE, CONTROLLER, ELECTRONIC IDENTIFICATION DEVICE AND SYSTEM

(71) Applicants: Chongqing BOE Smart Electronics System Co.,Ltd., Chongqing (CN); BOE Technology Group Co., Ltd., Beijing (CN)

(72) Inventors: Lichun Chen, Beijing (CN); Yunyan Xie, Beijing (CN); Bo Liu, Beijing (CN); Yuanzhuo Liu, Beijing (CN); Jun Wu, Beijing (CN)

(73) Assignees: CHONGQING BOE SMART ELECTRONICS SYSTEM CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/755,856

(22) PCT Filed: Mar. 16, 2021

(86) PCT No.: PCT/CN2021/081168
§ 371 (c)(1),
(2) Date: May 10, 2022

(87) PCT Pub. No.: WO2022/193150
PCT Pub. Date: Sep. 22, 2022

(65) Prior Publication Data
US 2023/0359854 A1    Nov. 9, 2023

(51) Int. Cl.
G06K 5/00 (2006.01)
G06K 19/07 (2006.01)
G06K 19/077 (2006.01)

(52) U.S. Cl.
CPC ... G06K 19/07707 (2013.01); G06K 19/0701 (2013.01)

(58) Field of Classification Search
CPC ......... G06K 19/07707; G06K 17/0029; G06K 19/07722; G06K 19/0701; G06F 1/3203; G06F 1/1652
(Continued)

(56) References Cited

U.S. PATENT DOCUMENTS 10,474,213 B1* 11/2019 Brown ................. G06F 1/3296
2006/0271678 A1* 11/2006 Jessup ................. G06F 1/3206
709/224
(Continued)

FOREIGN PATENT DOCUMENTS

CN 101980072 A 2/2011
CN 108398841 A 8/2018
(Continued)

Primary Examiner — Daniel St Cyr
(74) Attorney, Agent, or Firm — Workman Nydegger (57) ABSTRACT

A display method of an electronic identification device, a controller, an electronic identification device and a system are provided. The display method includes: controlling the electronic identification device to enter a working state from a sleep state, and obtaining to-be-displayed data; power consumption corresponding to the electronic identification device in the sleep state being lower than power consumption corresponding to the electronic identification device in the working state; and refreshing the to-be-displayed data to an electronic ink screen for display through a serial peripheral interface bus, and controlling the electronic identification device to enter the sleep state again after the refreshing is completed.

16 Claims, 7 Drawing Sheets

(58) Field of Classification Search
USPC .................................................. 235/492, 487
See application file for complete search history.

(56) References Cited

U.S. PATENT DOCUMENTS

| | | | | |
|---|---|---|---|---|
| 2011/0055434 | A1* | 3/2011 | Pyers | G06F 1/3293 |
| | | | | 713/400 |
| 2014/0092112 | A1* | 4/2014 | Solomon | G09G 5/393 |
| | | | | 345/545 |
| 2015/0278890 | A1 | 10/2015 | Yang | |
| 2016/0048363 | A1* | 2/2016 | North | G06F 1/1677 |
| | | | | 345/1.1 |
| 2016/0343178 | A1* | 11/2016 | Lesesky | B60C 23/0494 |
| 2020/0205077 | A1 | 6/2020 | Li et al. | |
| 2021/0349521 | A1 | 11/2021 | Pei et al. | |

FOREIGN PATENT DOCUMENTS

| | | | |
|---|---|---|---|
| CN | 108764427 | A | 11/2018 |
| CN | 208752364 | U | 4/2019 |
| CN | 110083396 | A | 8/2019 |
| CN | 111506336 | A | 8/2020 |
| CN | 212231495 | U | 12/2020 |

\* cited by examiner

```
┌─────────────────────────────────────────────┐
│ Controlling the electronic identification   │
│ device to enter a working state from a      │──── 101
│ sleep state, and obtaining the to-be-       │
│ displayed data; power consumption           │
│ corresponding to the electronic             │
│ identification device in the sleep state is │
│ lower than the power consumption            │
│ corresponding to the electronic             │
│ identification device in the working state  │
└─────────────────────────────────────────────┘
                      │
                      ▼
┌─────────────────────────────────────────────┐
│ Refreshing the to-be-displayed data to a    │
│ bistable electronic ink screen for display  │──── 102
│ through a serial peripheral interface bus,  │
│ and controlling the electronic              │
│ identification device to enter the sleep    │
│ state again after the refreshing is         │
│ completed                                   │
└─────────────────────────────────────────────┘
```

DISPLAY METHOD OF ELECTRONIC IDENTIFICATION DEVICE, CONTROLLER, ELECTRONIC IDENTIFICATION DEVICE AND SYSTEM

This application is a National Stage of International Application No. PCT/CN2021/081168, filed on Mar. 16, 2021, which is hereby incorporated by reference in its entirety.

FIELD

The disclosure relates to the field of smart office, and particularly to a display method of an electronic identification device, a controller, an electronic identification device and a system.

BACKGROUND

With the application of Internet of Things (IoT)+ technology in home and office environments, low-power products, especially low-power office products, have become popular demand.

The low-power products such as electronic tags, electronic chest cards and electronic table cards are often used in the office. Since the low-power products generally use wireless communication methods, the intelligent and smart office can be realized without cable deployment or transformation in the office, so the low-power products are popular with office workers. Moreover, these products do not conflict with the existing office supplies, can also realize the intelligent IoT, and are conducive to quickly building a fully intelligent office environment.

SUMMARY

In a first aspect, an embodiment of the disclosure provides a display method of an electronic identification device, including: controlling the electronic identification device to enter a working state from a sleep state, and obtaining to-be-displayed data; power consumption corresponding to the electronic identification device in the sleep state being lower than power consumption corresponding to the electronic identification device in the working state; refreshing the to-be-displayed data to a bistable electronic ink screen for display through a serial peripheral interface bus, and controlling the electronic identification device to enter the sleep state again after the refreshing is completed.

In a possible embodiment, controlling the electronic identification device to enter the working state from the sleep state, includes: controlling the electronic identification device to enter the working state and establish a WiFi communication with a server when a continuous duration of the sleep state reaches a set duration or charging is completed.

In a possible embodiment, obtaining the to-be-displayed data, includes: sending an inquiry to the server on whether there is to-be-transmitted data that needs to be transmitted, and receiving feedback information; obtaining the to-be-transmitted data from the server when determining that there is data that needs to be transmitted according to the feedback information; taking the to-be-transmitted data as the to-be-displayed data when the to-be-transmitted data needs to be displayed immediately; maintaining originally displayed data, and storing the to-be-transmitted data in a local non-transitory memory when the to-be-transmitted data does not need to be displayed immediately.

In a possible embodiment, after receiving the feedback information, the method further includes: entering the sleep state directly when determining that no data needs to be transmitted according to the feedback information.

In a possible embodiment, a communication protocol used in the WiFi communication includes at least one of TCP, IP, UDP, HTTP, HTTPS, MQTT.

In a possible embodiment, a configured network of the WiFi communication is switched among different networks through a signal received from a network configuration button.

In a possible embodiment, after refreshing the to-be-displayed data to the bistable electronic ink screen for display through the serial peripheral interface bus, the method further includes: obtaining indication picture data of a corresponding state when any one of a charging state, a power state and a communication state changes; updating data displayed on the electronic ink screen with the indication picture data.

In a possible embodiment, obtaining the indication picture data of the corresponding state, includes: obtaining indication picture data that charging is being performed in a charging phase.

In a possible embodiment, obtaining the indication picture data of the corresponding state, includes: obtaining indication picture data of low power when battery power is lower than a set power threshold.

In a possible embodiment, obtaining the indication picture data of the corresponding state, includes: obtaining indication picture data of successful networking when establishing a communication relationship with a server for first time.

In a possible embodiment, obtaining the indication picture data of the corresponding state, includes: obtaining indication picture data of network abnormality when an abnormality occurs in a network.

In a possible embodiment, after refreshing the to-be-displayed data to the bistable electronic ink screen for display through the serial peripheral interface bus, the method further includes: updating data currently displayed on the electronic ink screen with identification data originally displayed on the electronic ink screen when receiving a signal that charging is completed.

In a possible embodiment, after refreshing the to-be-displayed data to the bistable electronic ink screen for display through the serial peripheral interface bus, the method further includes: updating data currently displayed on the electronic ink screen with identification data originally displayed on the electronic ink screen when receiving a signal that a charging joint is pulled out.

In a possible embodiment, after refreshing the to-be-displayed data to the bistable electronic ink screen for display through the serial peripheral interface bus, the method further includes: updating data currently displayed on the electronic ink screen with identification data originally displayed on the electronic ink screen when the network returns to normal.

In a possible embodiment, the method further includes: switching to a corresponding power conversion mode according to a changed device state when a device state changes; the power conversion mode is a DC-to-DC mode when the device state is the working state; and the power conversion mode is a low dropout regulator mode when the device state is the sleep state.

In a second aspect, an embodiment of the disclosure provides a controller of an electronic identification device, and the controller performs the method described in the first aspect.

In a third aspect, an embodiment of the disclosure provides an electronic identification device, including: a bistable electronic ink screen, a WiFi communication module, and a power management module; the controller described in the second aspect, and the controller is connected to the electronic ink screen through two serial peripheral interfaces respectively and connected to the voltage management module through an IO interface.

In a fourth aspect, an embodiment of the disclosure provides an electronic identification system, including the electronic identification device described in the third aspect.

DETAILED DESCRIPTION OF EMBODIMENTS

Although the use of low-power products such as electronic tags, electronic chest cards and electronic table cards for intelligent IoT can quickly build the fully intelligent office environment, the wireless communication the low-power products use has high power consumption and requires common power supply methods to supply power, so that electronic tags, electronic chest cards, electronic table cards, etc. need to be charged or replace batteries from time to time.

Embodiments of the disclosure provide a display method of an electronic identification device, a controller, an electronic identification device and a system, to solve the above-mentioned technical problems in the related art.

In order to make the above-mentioned objects, features and advantages of the disclosure more apparent, the disclosure will be further illustrated below in combination with drawings and embodiments. However, embodiments can be implemented in various forms and should not be understood as being limited to embodiments illustrated here; and on the contrary, these embodiments are provided to make the disclosure more comprehensive and complete, and the concept of embodiments is fully conveyed to those skilled in the art. The same reference numbers represent same or similar structures in the drawings, so repeated description thereof will be omitted. The words expressing the positions and directions described in the disclosure are all intended to illustrate by taking the drawings as examples, but can also be changed as needed, where the changes made are all contained in the protection scope of the disclosure. The drawings of the disclosure are merely intended to illustrate the relative position relationship, but not represent the real proportion.

It is necessary to note that the specific details are illustrated in the following description to fully understand the disclosure. But the disclosure can be implemented in many other ways different from that described here, and those skilled in the art can make the similar modifications without violating the connotation of the disclosure. Thus the disclosure is not limited by embodiments disclosed below. The following description of the specification describes embodiments implementing the disclosure, but the said description is for the purpose of illustrating the general principle of the disclosure, and not intended to limit the scope of the disclosure. The protection scope of the disclosure should be limited by appended claims.

Related technologies of the disclosure are as follows.

The electronic ink screen is also called electronic paper, and the electronic ink in the electronic ink screen is to make the pigment into a thin film to form a large number of microcapsules, the size of the microcapsules is only a diameter of a human hair. Black and white globules in the microcapsules are pigment particles with different charges. In an initial state, the pigment particles are suspended in the microcapsules. After an electric field in a certain direction is applied, the corresponding pigment particles are pushed to the top, the microcapsules display different colors, and the microcapsules of different colors form various characters and patterns.

The display method of the electronic identification device, the controller, the electronic identification device and the system provided by embodiments of the disclosure will be illustrated below with reference to the accompanying drawings.

Figure 1:
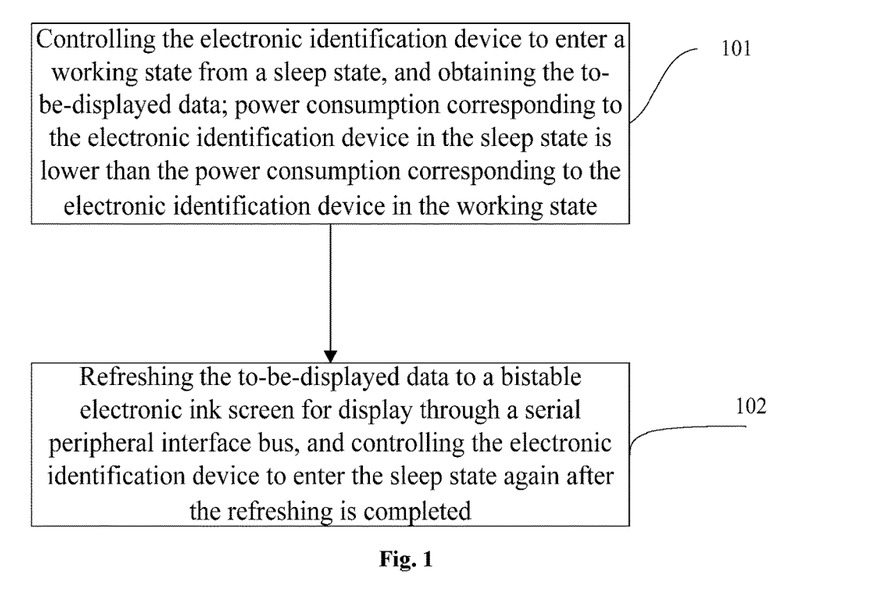
FIG. 1 is a flowchart of a display method of an electronic identification device according to an embodiment of the disclosure.

Referring to FIG. 1, a display method of an electronic identification device provided by an embodiment of the disclosure is applied to a controller of the electronic identification device, and the method includes following steps.

Step 101: controlling the electronic identification device to enter a working state from a sleep state, and obtaining to-be-displayed data; power consumption corresponding to the electronic identification device in the sleep state is lower than power consumption corresponding to the electronic identification device in the working state.

Step 102: refreshing the to-be-displayed data to a bistable electronic ink screen for display through a serial peripheral interface bus, and controlling the electronic identification device to enter the sleep state again after the refreshing is completed.

The electronic identification device may be an electronic door plate, an electronic tag, an electronic chest card, an electronic table card, etc.

Compared with the traditional LCD display, the electronic ink screen does not require continuous power supply and only consumes power when updating the display content, and the power consumption is low.

In an embodiment of the disclosure, the display of the electronic ink screen has the characteristics of low power consumption and bistable display, no power supply is required during static display, and the display content of the electronic identification device is in the static display state for a long time, so the use of the bistable electronic ink screen as the display screen of the electronic identification device can effectively utilize the characteristics of low power consumption and bistable display of the electronic ink screen to realize the low power consumption display design of the electronic identification device.

At the same time, the electronic identification device includes the sleep state and the working state. After the electronic identification device is controlled to enter the working state, the obtained to-be-displayed data is refreshed to the electronic ink screen for display, and the electronic identification device is controlled to enter the sleep state again after the refresh is completed. In this way, the electronic identification device can be kept in the sleep state for a long time, so that the electronic identification device is in the ultra-low power consumption state. Even if the electronic identification device is in the working state, the power consumption of the electronic ink screen used is much lower than that of an ordinary liquid crystal screen, so the power consumption of the electronic identification device in the working state is also relatively low, further reducing the power consumption of the electronic identification device and increasing the service time thereof. Since the service time of the electronic identification device is increased, the frequency of battery replacement or charging is reduced.

Figure 2:
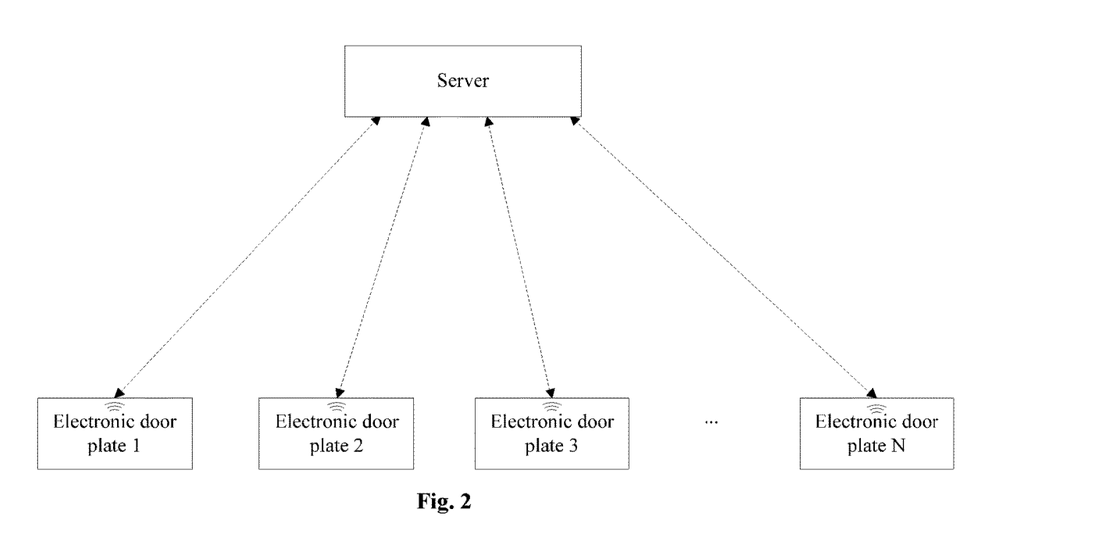
FIG. 2 is a schematic diagram of communication between an electronic identification device and a server according to an embodiment of the disclosure.

Referring to FIG. 2, FIG. 2 is a schematic diagram of communication between an electronic identification device and a server according to an embodiment of the disclosure.

Assuming that the electronic identification device in FIG. 2 is an electronic door plate, there are N offices in a company, so the electronic door plates of the company include electronic door plates 1 to N, and the electronic door plates 1 to N are respectively set on the doors of different offices of the company.

Usually these electronic door plates are in the sleep state, and the electronic door plates may be automatically woken up periodically to enter the working state. When these electronic door plates enter the working state from the sleep state, the to-be-displayed data may be obtained from the server through wireless communication, and the to-be-displayed data is refreshed to the bistable electronic ink screen for display through a serial peripheral interface bus. The electronic door plates enter the sleep state again after the refresh is completed. If the server needs to update the information displayed on an electronic door plate, the to-be-displayed data is to-be-updated data.

In a possible embodiment, the step of controlling the electronic identification device to enter the working state from the sleep state may be implemented by: controlling the electronic identification device to enter the working state and establish a WiFi communication with a server when a continuous duration of the sleep state reaches a set duration or charging is completed.

Figure 3:
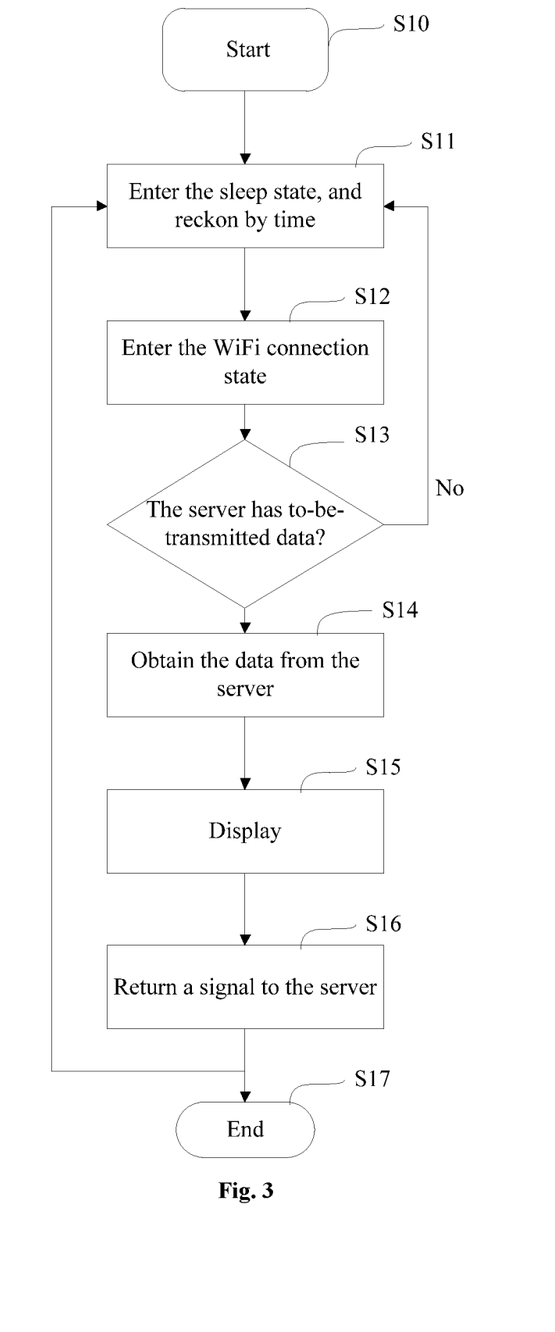
FIG. 3 is a flowchart of data transmission of an electronic identification device according to an embodiment of the disclosure.

For example, referring to FIG. 3, FIG. 3 is a flowchart of data transmission of an electronic identification device according to an embodiment of the disclosure.

Step S10: start.

At the beginning, the electronic identification device is initialized. It is assumed that the electronic identification device enters the sleep state immediately after initialization. Of course, the electronic identification device may also be set to enter the working state immediately. In FIG. 3, the case of entering the sleep state immediately after initialization is taken as an example.

Step S11: enter the sleep state, and reckon by time.

After the electronic identification device enters the sleep state, the duration of the sleep state starts to be counted. After the time reaches a set duration (e.g., 5 minutes), the electronic identification device enters the working state, that is, performs steps S12 to S16.

Step S12: enter the WiFi connection state.

After entering the working state, the electronic identification device establishes a WiFi communication with the server. The electronic identification device needs to enter the WiFi state at first, and sends information on whether there is to-be-transmitted data to the server. After receiving feedback information sent by the server, step S13 is performed.

Step S13: determine whether the server has to-be-transmitted data.

According to the received feedback information, it can be determined whether the server has to-be-transmitted data. If there is no to-be-transmitted data, step S11 continues to be performed to enter the sleep state and reckon by time. If there is to-be-transmitted data, step S14 is performed.

Step S14: obtain the data from the server.

If the obtained data needs to be displayed immediately, the data is refreshed to the electronic ink screen for display (i.e., step S15 is performed); and if the data is not required to be displayed immediately, the data is stored locally.

Step S15: display.

The data is refreshed to the electronic ink screen for display.

Step S16: return a signal to the server to indicate that data reception is completed.

The data transmission is completed, and step S11 continues to be performed to enter the sleep state.

Step S17: end, the electronic identification device is turned off.

Figure 5:
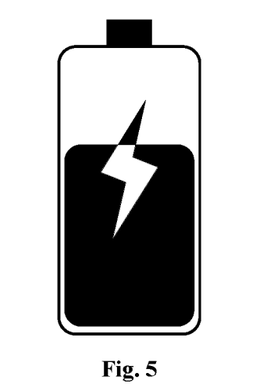
FIG. 5 is a schematic diagram of an indication picture that charging is being performed according to an embodiment of the disclosure.

It should be understood that steps S15 and S16 in FIG. 5 have no order and may be interchanged.

The WiFi communication between the electronic identification device and the server adopts the transparent transmission mode to transmit data.

For example, the electronic identification device is an electronic table card, and the electronic table card is set to be awakened every 10 minutes, and 10 minutes is the set duration. When the electronic table card keeps in the sleep state continuously for 10 minutes, the table card enters the working state from the sleep state and establishes a WiFi communication with the server.

For another example, the electronic table card receives a signal that the charging is completed at a certain moment, and the electronic table card establishes a WiFi communication with the server.

The step of obtaining the to-be-displayed data may be achieved by: sending an inquiry to the server on whether there is to-be-transmitted data that needs to be transmitted, and receiving feedback information; obtaining the to-be-transmitted data from the server when determining that there is data that needs to be transmitted according to the feedback information; taking the to-be-transmitted data as the to-be-displayed data when the to-be-transmitted data needs to be displayed immediately; maintaining originally displayed data and storing the to-be-transmitted data in a local non-transitory memory when the to-be-transmitted data does not need to be displayed immediately.

In a possible embodiment, after receiving the feedback information, the sleep state is directly entered if it is determined according to the feedback information that no data needs to be transmitted.

For example, after establishing a WiFi communication with the server, the electronic table card sends an inquiry to the server on whether there is to-be-transmitted data that needs to be transmitted. Assuming that the server needs to update a conference organizer LOGO stored in the electronic identification device at this time, the server may send the feedback information that the to-be-transmitted data needs to be transmitted to the electronic table card. After receiving the feedback information, the electronic table card obtains the conference organizer LOGO from the server, determines that the conference organizer LOGO needs to be displayed immediately according to a display identifier carried in the to-be-transmitted data, updates a locally stored LOGO with the conference organizer LOGO and displays conference organizer LOGO on the electronic ink screen. After the display is completed, the electronic table card is controlled to directly enter the sleep state.

For another example, after establishing a WiFi communication with the server, the electronic table card sends an inquiry to the server on whether there is to-be-transmitted data that needs to be transmitted. Assuming that the server has no data that needs to be transmitted at this time, the server sends the feedback information that no data needs to be transmitted to the electronic table card. After receiving the feedback information, the electronic table card keeps displaying original data and directly enters the sleep state.

Or, the feedback information received by the electronic table card is that there is data that needs to be transmitted, and the electronic table card obtains the to-be-transmitted data from the server (assuming that identification information of low power is to be updated). After receiving the to-be-transmitted data, the electronic table card determines that the to-be-transmitted data does not need to be displayed immediately, so the identification information of low power is stored in the local non-transitory memory to update original identification information of low power.

In the related art, the electronic table card, electronic tag, etc. communicate with the server through wireless communication. For example, when the WiFi communication is used, the server sends data to the electronic tag, and the electronic tag needs to be connected to the router all the time. In this way, the server can send the data to the electronic tag through the router. Since the electronic tag needs to be kept in the connected state, communication components of the electronic tag need to be in the working state all the time, thereby increasing power consumption of the electronic tag.

In the related art, if the electronic tag adopts the existing non-WiFi communication (such as Bluetooth, 2.4G private protocol, low-frequency wireless communication), it is also necessary to use different IC schemes to design dedicated wireless Access Points (APs) correspondingly, and the APs need to be arranged within the specified area, so that the corresponding dedicated AP is matched with the electronic tag. Also, the dedicated APs need to be arranged in locations with network and power supply, so that the usage scenarios of the electronic tag are limited and the user experience is reduced.

However, in the scheme provided by an embodiment of the disclosure, the WiFi communication is used to communicate between the electronic identification device and the server (or other smart device that manages the electronic identification device), and the existing router in the office is used to establish the communication without additionally deploying a dedicated AP for the electronic identification device, thereby maximizing the application range of the electronic identification device and improving the user experience without increasing the cost. In addition, the electronic identification device is further allowed to control the initiative to communicate with the server, so that the frequency of the electronic identification device connecting to the network is controllable, avoiding the need for the electronic tag to keep connected to the network constantly in a passive way as in the related art, and thereby further reducing the power consumption of the electronic identification device.

In a possible embodiment, the communication protocols used in the WiFi communication include at least one of Transmission Control Protocol (TCP), Internet Protocol (IP), User Datagram Protocol (UDP), Hyper Text Transfer Protocol over SecureSocket Layer (HTTP), Hyper Text Transfer Protocol over SecureSocket Layer (HTTPS), Message Queuing Telemetry Transport (MQTT). One or more of the above protocols may be set as the protocol(s) of the WiFi communication in the electronic identification device.

In a possible embodiment, a configured network of the WiFi communication is switched among different networks through a signal received from a network configuration button.

For example, the electronic identification device includes a variety of communication protocols, and the user may select a corresponding network to communicate with the server through the network configuration button set on the electronic identification device. After receiving the signal of the network configuration button, the electronic identification device configures the network according to the corresponding protocol. Or, when a space includes a plurality of networks, the user may select the protocol corresponding to the required network through the network configuration button to configure the network.

Of course, the above-mentioned network configuration button may not be set on the electronic identification device, and the electronic identification device may automatically match with the network with the strongest signal according to the signal strength.

By setting the network configuration button on the electronic identification device, the user can configure the network according to actual requirements. For example, when the electronic identification device is an electronic chest card, and after a user wearing the electronic chest card enters the network coverage area 2 from the network coverage area 1, the user may re-configure a network for the electronic chest card through the network configuration button, so that the electronic chest card accesses to the network corresponding to the network coverage area 2.

A reset button may also be set on the electronic identification device. When the electronic identification device fails or has a special situation, the user resets the electronic identification device through the reset button.

In a possible embodiment, after refreshing the to-be-displayed data to the bistable electronic ink screen for display through the serial peripheral interface bus, the method further includes: obtaining an indication picture of a corresponding state when any one of a charging state, a power state and a communication state changes; and updating data displayed on the electronic ink screen with the indication picture.

When any one of the charging state, the power state and the communication state in the electronic identification device changes, the corresponding indication picture data is updated to the electronic ink screen to prompt the user that the corresponding state has changed, to avoid the case of using an indicator light to indicate the information of the above state change as in the related art. Since the electronic ink screen needs to consume power only when refreshing the data, the power consumption of the electronic identification device can be further reduced by replacing the indicator light with the indication picture.

The indication picture data of the corresponding state may be obtained by: obtaining indication picture data that charging is being performed in a charging phase; obtaining indication picture data of low power when the battery power is lower than a set power threshold; obtaining indication picture data of successful networking when establishing a communication relationship with a server for the first time; obtaining indication picture data of network abnormality when an abnormality occurs in a network.

Figure 4:
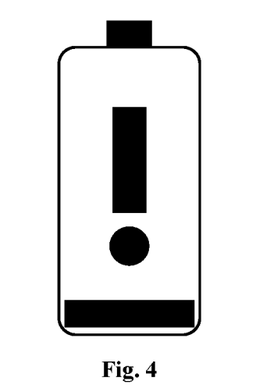
FIG. 4 is a schematic diagram of an indication picture of low power according to an embodiment of the disclosure.

For example, when the battery power of the electronic identification device is lower than the set threshold, it is determined that the power state of the electronic identification device becomes the low power state, the indication picture data of low power corresponding to the low power state is obtained (as shown in FIG. 4, FIG. 4 is a schematic diagram of an indication picture of low power according to an embodiment of the disclosure), and the indication picture data of low power is refreshed to the electronic ink screen for display. Or, the indication picture data that charging is being performed is obtained in the charging stage (as shown in FIG. 5, FIG. 5 is a schematic diagram of an indication picture that charging is being performed according to an embodiment of the disclosure), and the indication picture data that charging is being performed is refreshed to the electronic ink screen for display.

Figure 6:
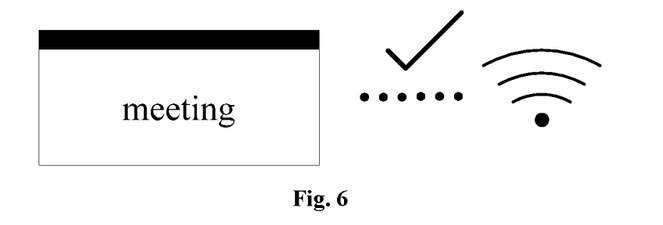
FIG. 6 is a schematic diagram of an indication picture of successful networking according to an embodiment of the disclosure.

For another example, when the electronic identification device establishes a communication relationship with the server for the first time, for example, when the WiFi connection is successful, it is determined that the communication state of the electronic identification device has changed, and the indication picture data of successful networking is obtained from the local non-transitory memory (as shown in FIG. 6, FIG. 6 is a schematic diagram of an indication picture of successful networking according to an embodiment of the disclosure, showing that the networking of the meeting is successful) and refreshed to the electronic ink screen for display.

For another example, when the WiFi connection between the electronic identification device and the server is interrupted, and the interruption time exceeds an interruption threshold (such as 2 minutes), it is determined that the network of the electronic identification device is abnormal, and the indication picture data of network abnormality is obtained from the local non-transitory memory.

In a possible embodiment, after the to-be-displayed data is refreshed to the bistable electronic ink screen for display through the serial peripheral interface bus, and when a signal that charging is completed is received, data currently displayed on the electronic ink screen is updated with identification data originally displayed on the electronic ink screen.

Figure 7:
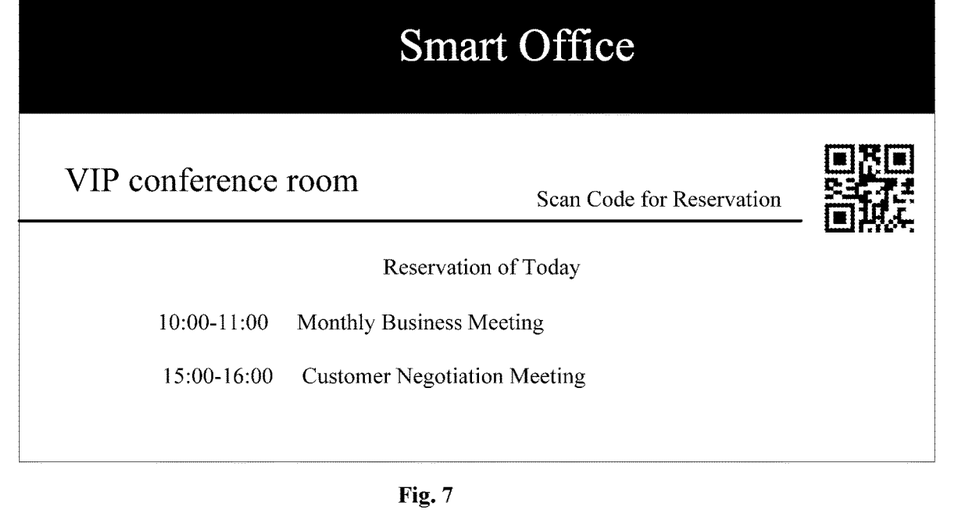
FIG. 7 is a schematic diagram of identification data originally displayed on an electronic ink screen according to an embodiment of the disclosure.

For example, referring to FIG. 7, FIG. 7 is a schematic diagram of the identification data originally displayed on the electronic ink screen according to an embodiment of the disclosure. The electronic identification device shown in FIG. 7 is an electronic door plate. The identification data displayed on the electronic door plate includes "Smart Office", the corresponding conference room is "VIP conference room", and a QR code for reserving the conference room is also displayed. A user may reserve when to use the VIP conference room through the QR code next to "Scan Code for Reservation". For example, the electronic door plate shows that two meetings that have reserved the VIP conference room today are a monthly business meeting at 10:00-11:00 and a customer negotiation meeting at 15:00-16:00.

Figure 8:
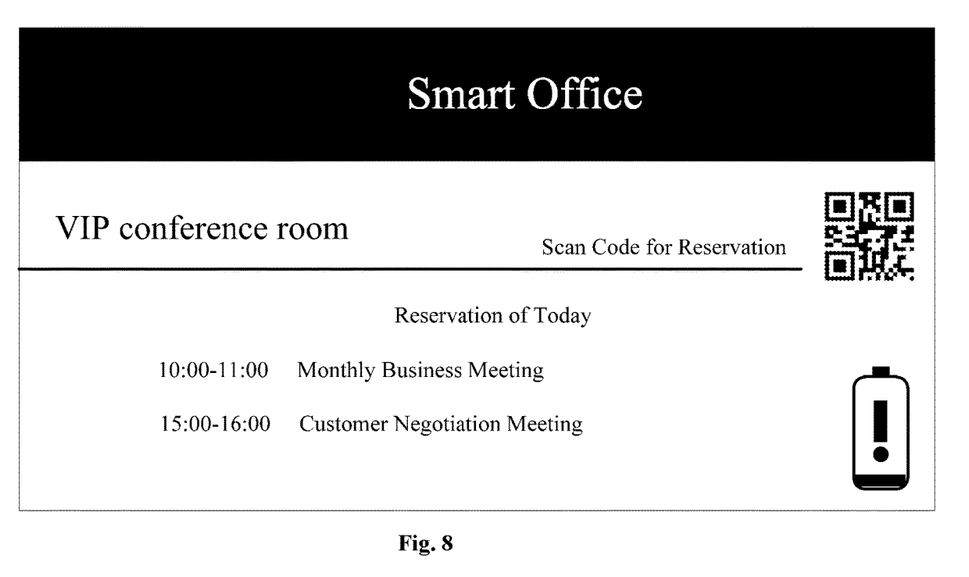
FIG. 8 is a schematic diagram displayed on an electronic ink screen according to an embodiment of the disclosure.

Assuming that the electronic door plate receives a signal of low power, the indication picture of low power shown in FIG. 4 may be refreshed onto the electronic ink screen of the electronic door plate. At this time, the content displayed on the electronic ink screen refers to FIG. 8, FIG. 8 is a schematic diagram of the display of the electronic ink screen according to an embodiment of the disclosure. When the electronic door plate receives a signal that charging is completed, the data currently displayed on the electronic ink screen (as shown in FIG. 8) is updated with the identification data originally displayed on the electronic ink screen (as shown in FIG. 7).

Or, if the above-mentioned electronic door plate replaces the battery, the data currently displayed on the electronic ink screen is updated with the identification data originally displayed on the electronic ink screen.

In a possible embodiment, after the to-be-displayed data is refreshed to the bistable electronic ink screen for display through the serial peripheral interface bus, and when the electronic identification device receives a signal that the charging joint is pulled out, the data currently displayed on the electronic ink screen is updated with the identification data originally displayed on the electronic ink screen.

Assuming that the charging port of the electronic identification device adopts a TYPE C interface, when it is detected that the charging joint inserted into the TYPE C interface is pulled out, the data currently displayed on the electronic ink screen may be updated with the identification data originally displayed on the electronic ink screen.

In a possible embodiment, after the to-be-displayed data is refreshed to the bistable electronic ink screen for display through the serial peripheral interface bus, and when the network of the electronic identification device returns to normal, the data currently displayed on the electronic ink screen is updated with the identification data originally displayed on the electronic ink screen.

Updating the data displayed on the electronic ink screen with the indication picture data may be: merging the originally displayed identification data with the indication picture data and updating the originally displayed identification data and the indication picture data together, or determining a display area of the corresponding part of the indication picture data from the electronic ink screen and only updating the data in this display area.

For example, taking FIGS. 7 and 8 as examples, the identification data displayed on the electronic door plate is shown in FIG. 7. When the controller of the electronic door plate receives a signal of low power, the indication picture of low power shown in FIG. 4 needs to be refreshed onto the electronic ink screen of the electronic door plate. FIGS. 4 and 7 may be merged to obtain a merged picture (as shown in FIG. 8), or a display area (such as a specific area drawn in the lower right corner of the electronic ink screen in FIG. 7) may be preset as the display area for displaying the indication picture data. After the signal of low power is received, the indication picture of low power is refreshed to the display area.

By refreshing the indication picture data to the display area of the corresponding part of the electronic ink screen, the update of the indication picture data is realized by means of partial refresh, so that the power can be effectively saved.

A temperature sensor may further be set in the electronic identification device, and the temperature sensor may detect the current ambient temperature. The optimal driving waveform of the electronic ink screen may be determined through the temperature detected by the temperature sensor, and the optimal driving waveform is used as the waveform for driving the electronic ink screen.

The power management of the electronic identification device may be realized by switching between the DC-to-DC (DC/DC) topology and the Low Dropout Regulator (LDO) topology. The corresponding power conversion mode is switched to according to the changed device state when the device state changes.

Here, the power conversion mode is a DC-to-DC mode when the device state is the working state; and the power conversion mode is a low dropout regulator mode when the device state is the sleep state.

For example, the electronic identification device is an electronic door plate. When the electronic door plate is in the sleep state, the power conversion mode is the Low Dropout Regulator (LDO) mode. After the electronic door plate enters the working state from the sleep state, the power conversion mode is switched to the DC-to-DC (DC/DC) mode.

Figure 9:
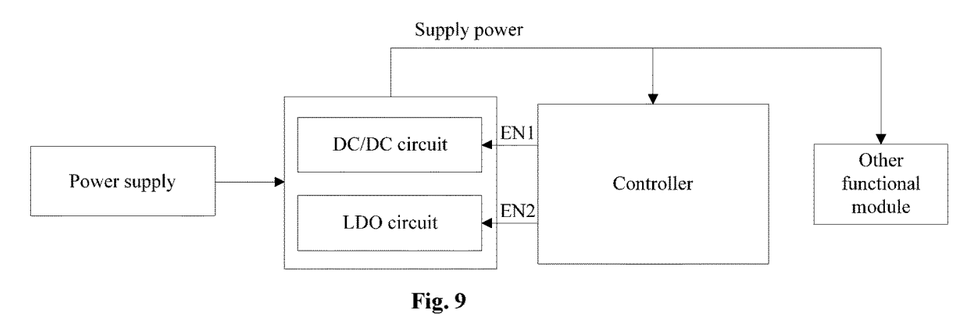
FIG. 9 is a schematic diagram of power supply of an electronic identification device according to an embodiment of the disclosure.

Referring to FIG. 9, FIG. 9 is a schematic diagram of power supply of an electronic identification device according to an embodiment of the disclosure.

The power supply in FIG. 9 is a battery, and the battery may be a rechargeable battery or a non-rechargeable battery. For example, the battery is a rechargeable battery, the rechargeable battery provides a voltage in a range of 3.7V to 5V and provides the voltage to a voltage conversion circuit. The voltage conversion circuit includes a DC/DC circuit and an LDO circuit, and both of the DC/DC circuit and the LDO circuit may convert the voltage provided by the rechargeable battery to a voltage of 3.3V to supply power to the controller and other functional modules (such as a memory, a sensor, a communication module, etc.) in the electronic identification device. The controller controls the output of different enable signals according to the change of the device state, to enable the DC/DC circuit or the LDO circuit to work. For example, the controller controls the DC/DC circuit or the LDO circuit by outputting two enable signals (EN1, EN2) in FIG. 9. For example, the DC/DC circuit works when the enable signal EN1 is valid, and the DC/DC circuit enters the sleep state (which may also called low-power state) when EN1 is invalid; the LDO circuit works when the enable signal EN2 is valid, and the LDO circuit enters the sleep state (which may also called low-power state) when EN2 is invalid.

In the related art, the DC/DC power supply is generally used alone, so the sleep current can reach 3 mA even if the DC/DC power supply with light load and high efficiency in the latest technology is used, which may lead to the loss of 72 mAh due to sleep every day. If a battery of 5000 mAh is used, the battery may be used up even if it does not work and just sleeps for 70 days (70 days×72 mAh=50000 mAh). In an embodiment of the disclosure, due to the introduction of the LDO, the standby loss of the LDO is less than 40 nA, which is 75 times lower than that of DC/DC (3 mA). In the scheme of the disclosure, the electronic identification device can be in the sleep state for a long time, and the LDO with lower power consumption is used in the sleep state, further reducing the power consumption of the electronic identification device and increasing the service time of the electronic identification device.

The disclosure does not select the LDO alone, because the load current of the electronic identification device during normal operation (screen refresh, data transmission, WiFi connection) is relatively large and can reach 400 mA in an instant, the average current can reach 70 mA, and the loss of the LDO is $V_{DROP}$×current=1×0.4=0.4 W, that is, the loss of the LDO used alone is too large and the power efficiency is low. Therefore, the working mode of switching between DC/DC and LDO can achieve the lowest power consumption in the disclosure.

Figure 10:
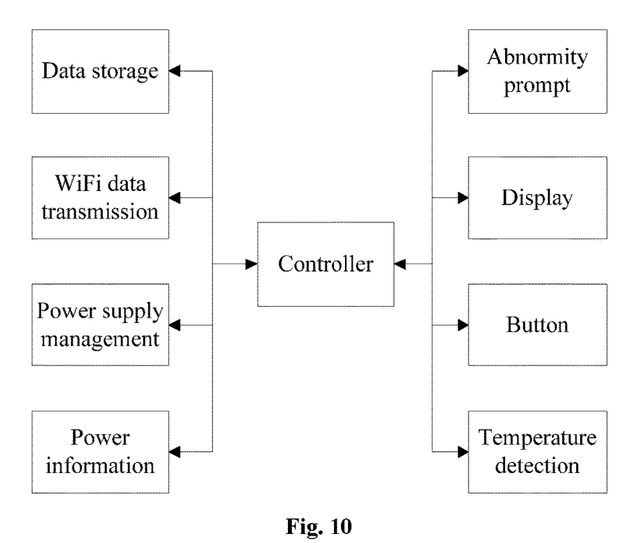
FIG. 10 is a structural schematic diagram of an electronic identification device according to an embodiment of the disclosure.

Referring to FIG. 10, FIG. 10 is a structural schematic diagram of an electronic identification device according to an embodiment of the disclosure.

It is assumed that functions of the electronic identification device include WiFi data transmission, data storage, power supply management, power information, abnormity prompt of network or power, display of user information, network configuration (implemented by a button), temperature detection, etc. These functions are managed by a controller.

When performing the WiFi data transmission, the controller may communicate with the WiFi module through transparent transmission. For example, after receiving the to-be-transmitted data, the WiFi communication module transmits the data information to the controller through a 4-wire SPI, and the controller then performs related processing (such as display or store) on the received data.

The data storage may use a data storage circuit (such as Flash), which may store the data received by the controller from the WiFi communication module, such as identification data, indication picture data, etc. Taking the controller being MCU and the data storage circuit being Flash as an example, the MCU can communicate with the Flash through the SPI interface to realize the data transmission between the MCU and the Flash.

The power supply management mainly realizes the management and prompt of the charging process and charging completion. The controller determines whether the power supply is currently in the charging state, whether the charging is completed, whether the power is low, etc. by detecting the change in level state of an IO interface of the power supply management chip. For example, the power supply management chip notifies the controller of whether the battery is currently in the charging state through a high/low level state of the IO interface, and the controller can determine whether the battery is in the charging state by detecting the level state of the IO interface. If the battery is in the charging state, the indication data picture of the corresponding state is obtained from the data storage circuit and refreshed to the electronic ink screen for display.

Figure 11:
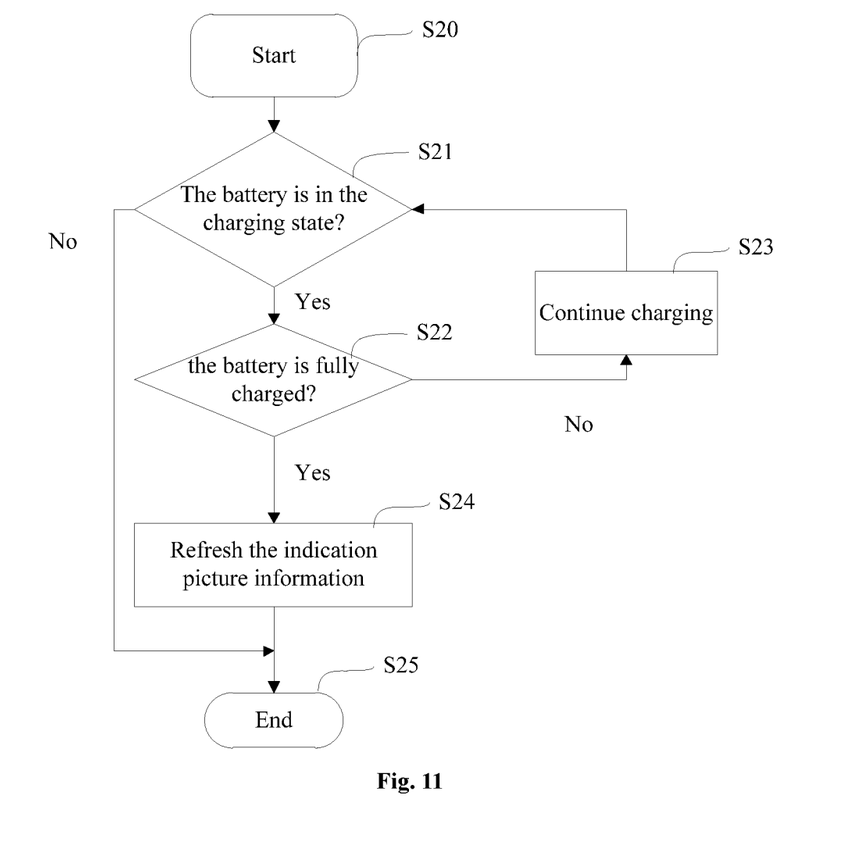
FIG. 11 is a flowchart of charging detection according to an embodiment of the disclosure.

Referring to FIG. 11, FIG. 11 is a flowchart of charging detection according to an embodiment of the disclosure.

Step S20: start, and an intelligent identification device completes initialization.

Step S21: determine whether the battery is in the charging state.

The controller in the intelligent identification device detects an IO interface of the power supply management chip, and determines whether the battery is in the charging state according to the detection result of the IO interface; if the battery is not in the charging state, no operation is performed. If the battery is in the charging state, it is further determined whether the battery is fully charged (i.e., step S22 is performed).

Step S22: determine whether the battery is fully charged.

If the battery is not fully charged, charging is continued (i.e., step S23 is performed); if the battery is fully charged, the indication picture information is refreshed (i.e., step S24 is performed) to the electronic ink screen.

Step S23: continue charging.

Also, the step S21 and step S22 continue to be performed circularly.

Step S24: refresh the indication picture information.

For example, the indication picture information that the charging is completed is refreshed to the electronic ink screen.

Step S25: end, and the electronic identification device is turned off.

Regarding power information, the controller may read current power information of the battery through an analog-to-digital conversion interface, and report the power information to the server through the WiFi communication module. When the power is lower than a set power threshold (such as 20%), the controller may obtain indication picture data of low power and refresh the indication picture data of low power to the electronic ink screen for display.

Regarding abnormal prompt, for example, the controller detects the networking state of the WiFi communication module through the IO interface. When determining that the WiFi communication module fails to access to the network within specified time (such as 1 minute), it can be determined that the network is abnormal, and the controller may obtain indication picture data of network abnormity and refresh the indication picture data of network abnormity to the electronic ink screen.

Regarding display, the controller is connected to the electronic ink screen through the SPI interface and refreshes the content that the user needs to display, such as identification data, indication picture data, etc., to the electronic ink screen for display.

Regarding network configuration, a network configuration button can be set in the electronic identification device to configure the network. For example, when the electronic identification device needs to connect to a new WiFi network, the user may send an instruction to the controller to control the WiFi communication module to configure the network through the network configuration button.

Regarding reset, another reset button may be set in the electronic identification device to reset the electronic identification device. For example, when the program in the controller is abnormal, crashes or has other special situation, the user may reset the electronic identification device through the reset button.

Regarding temperature detection, the controller may communicate with a temperature sensor through an I$^2$C interface, obtain the current ambient temperature measured by the temperature sensor, retrieve the driving waveform of the electronic ink screen corresponding to the current ambient temperature, and refresh the to-be-displayed data to the electronic ink screen for display.

Assuming that the controller is allowed to work every 5 minutes, that is, the controller keeps in the sleep state continuously for 5 minutes and then enters the working state once, and the WiFi connection state is synchronized with the working state, that is, the WiFi connection state is maintained in the working state, while there is no connection to WiFi in the sleep state. The refresh of the electronic ink screen, the power supply management, the temperature sensor, etc. are all in the low power consumption state when they do not work, and they all keep in the same state as the controller. Taking the power supply of the electronic identification device being a rechargeable battery of 5000 mAh as an example, the power consumption of the electronic identification device (assumed as an electronic door plate) is evaluated as follows: 1) Data transmission of controller: 20 mA/10 s; 2) Refresh screen: 110 mA/30 s; 3) WiFi connection: 70 mA/3 s; 4) WiFi data transmission: 70 mA/7 s; 5) Standby: 50 μA (power consumption of DC/DC standby has been considered).

The picture is refreshed twice a day. Every time the picture is refreshed, there is a need to refresh the screen once and transmit the data of the controller once. If the pictures used are all obtained by the server at this time, there is also a need to transmit the WiFi data once. Therefore, the power required to refresh the screen once is (20×10+110×30+70×7) mAs, and the power consumed by refreshing the screen (twice) every day is (20×10+110×30+70×7)×2 mAs. There are 24 hours in a day. The electronic identification device is connected to the network every 5 minutes (because the time to connect to the network is very short, it is approximately regarded as every 5 minutes), and the duration of one connection is 3 s, so the duration (set duration) in which the sleep state (standby) is continuously maintained is (5×60−3)=2975, the number of times to work per day is 24×60/5=288 times, and then the power consumption of the WiFi connection and standby every day is (70×3+0.05×297)×288) mAs. One hour is 3600 s, and the power of the battery is 5000 mAh, so the usable time for one charge is calculated as follows: 5000/(((20×10+110×30+70×7)×2+(70×3+0.05×297)×288))/3600)=248 days.

Therefore, the bistable electronic ink screen is used as the display screen of the electronic identification device. If the network is connected every 5 minutes and the picture is refreshed twice a day, the user can use electronic identification device for more than half a year on a single charge in theory. Due to the characteristics of the chemical components in a polymer rechargeable battery, the battery needs to be charged every six months. Therefore, the user may design the connection to be established every 3 minutes or according to the user's choice, to ensure the service time of the battery and also ensure a faster response speed, allowing the user to obtain better experience.

Based on the same inventive concept, an embodiment of the disclosure provides a controller of an electronic identification device, and the controller performs the above method. The controller may be, for example, a Microcontroller Unit (MCU), a single chip, a microcontroller (Advanced RISC Machine (ARM)), etc.

Figure 12:
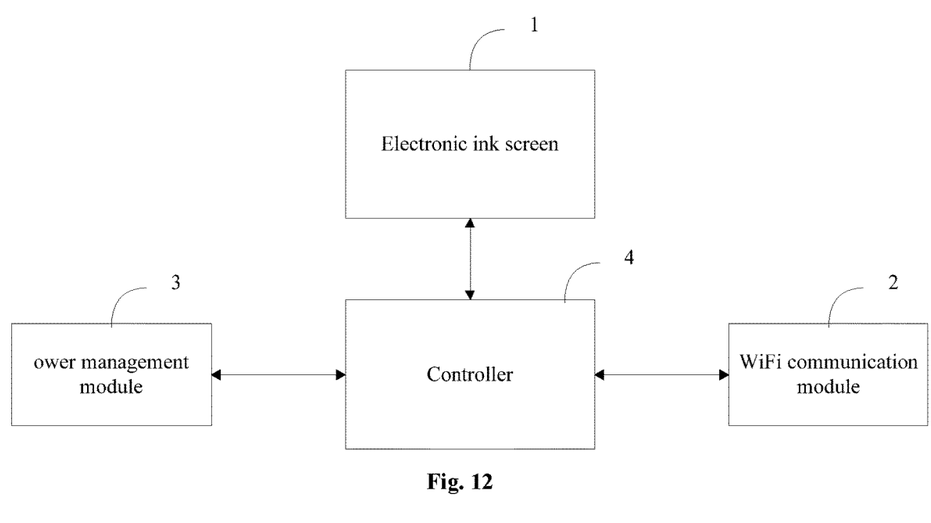
FIG. 12 is a structural schematic diagram of another electronic identification device according to an embodiment of the disclosure.

Based on the same inventive concept, an embodiment of the disclosure provides an electronic identification device, as shown in FIG. 12, including: a bistable electronic ink screen 1, a WiFi communication module 2, and a power management module 3; the above controller 4 that is connected to the electronic ink screen 1 through two serial peripheral interfaces respectively and connected to the voltage management module 3 through an IO interface.

The electronic identification device may further include a non-transitory memory, a temperature detection module, a reset button, a network configuration button, etc.

The electronic identification device may be an electronic tag, an electronic door plate, an electronic table card, an electronic chest card, etc.

Based on the same inventive concept, an embodiment of the disclosure provides an electronic identification system, including the above electronic identification device.

Although embodiments of the disclosure have been described, those skilled in the art can make additional alterations and modifications to these embodiments once they learn about the basic creative concepts. Thus the attached claims are intended to be interpreted to include embodiments as well as all the alterations and modifications falling within the scope of the disclosure.

Evidently those skilled in the art can make various modifications and variations to the disclosure without departing from the spirit and scope of the disclosure. Thus the disclosure is also intended to encompass these modifications and variations to the disclosure as long as these modifications and variations come into the scope of the claims of the disclosure and their equivalents.

What is claimed is:

1. A display method of an electronic identification device, comprising:
controlling the electronic identification device to enter a working state from a sleep state, and obtaining to-be-displayed data; power consumption corresponding to the electronic identification device in the sleep state being lower than power consumption corresponding to the electronic identification device in the working state;
refreshing the to-be-displayed data to an electronic ink screen for display through a serial peripheral interface bus, and controlling the electronic identification device to enter the sleep state again after the refreshing is completed;
the method further comprising:
switching to a corresponding power conversion mode according to a changed device state when a device state changes;
wherein the power coversion mode is a DC-to-DC mode when the device state is the working state; and the power conversion mode is a low dropout regulator mode when the device state is the sleep state.

2. The display method according to claim 1, wherein controlling the electronic identification device to enter the working state from the sleep state, comprises:
controlling the electronic identification device to enter the working state and establish a WiFi communication with a server when a continuous duration of the sleep state reaches a set duration or charging is completed.

3. The display method according to claim 1, wherein obtaining the to-be-displayed data, comprises:
sending an inquiry to the server on whether there is to-be-transmitted data that needs to be transmitted, and receiving feedback information;
obtaining the to-be-transmitted data from the server when determining that there is data that needs to be transmitted according to the feedback information;
taking the to-be-transmitted data as the to-be-displayed data when the to-be-transmitted data needs to be displayed immediately; maintaining originally displayed data and storing the to-be-transmitted data in a local non-transitory memory when the to-be-transmitted data does not need to be displayed immediately.

4. The display method according to claim 3, wherein after receiving the feedback information, the method further comprises:
entering the sleep state directly when determining that no data needs to be transmitted according to the feedback information.

5. The display method according to claim 3, wherein a communication protocol used in the WiFi communication comprises at least one of TCP, IP, UDP, HTTP, HTTPS, MQTT.

6. The display method according to claim 5, wherein a configured network of the WiFi communication is switched among different networks through a signal received from a network configuration button.

7. The display method according to claim 1, wherein after refreshing the to-be-displayed data to the electronic ink screen for display through the serial peripheral interface bus, the method further comprises:
obtaining indication picture data of a corresponding state when any one of a charging state, a power state and a communication state changes;
updating data displayed on the electronic ink screen with the indication picture data.

8. The display method according to claim 7, wherein obtaining the indication picture data of the corresponding state, comprises:
obtaining indication picture data that charging is being performed in a charging phase.

9. The display method according to claim 8, wherein after refreshing the to-be-displayed data to the electronic ink screen for display through the serial peripheral interface bus, the method further comprises:
updating data currently displayed on the electronic ink screen with identification data originally displayed on the electronic ink screen when receiving a signal that charging is completed.

10. The display method according to claim 7, wherein obtaining the indication picture data of the corresponding state, comprises:
obtaining indication picture data of low power when battery power is lower than a set power threshold.

11. The display method according to claim 10, wherein after refreshing the to-be-displayed data to the electronic ink screen for display through the serial peripheral interface bus, the method further comprises:
updating data currently displayed on the electronic ink screen with identification data originally displayed on the electronic ink screen when receiving a signal that a charging joint is pulled out.

12. The display method according to claim 7, wherein obtaining the indication picture data of the corresponding state, comprises:
obtaining indication picture data of successful networking when establishing a communication relationship with a server for first time.

13. The display method according to claim 7, wherein obtaining the indication picture data of the corresponding state, comprises:
obtaining indication picture data of network abnormality when an abnormality occurs in a network.

14. The display method according to claim 13, wherein after refreshing the to-be-displayed data to the electronic ink screen for display through the serial peripheral interface bus, the method further comprises:
updating data currently displayed on the electronic ink screen with identification data originally displayed on the electronic ink screen when the network returns to normal.

15. A controller of an electronic identification device, performing operation, the operation comprising:
controlling the electronic identification device to enter a working state from a sleep state, and obtaining to-be-displayed data; power consumption corresponding to the electronic identification device in the sleep state being lower than power consumption corresponding to the electronic identification device in the working state;
refreshing the to-be-displayed data to an electronic ink screen for display through a serial peripheral interface bus, and controlling the electronic identification device to enter the sleep state again after the refreshing is completed;

the operations further comprising:
switching to a corresponding power conversation mode according to a changed device state when a device state changes;
wherein the power conversion mode is a DC-to-DC mode when the device state is the working state, and the power coversion mode is a low dropout regulator mode when the device state is the sleep state.

16. An electronic identification device, comprising:
an electronic ink screen, a WiFi communication module, and a power management module;
a controller connected to the electronic ink screen through two serial peripheral interfaces respectively, and connected to the voltage management module through an IO interface; the controller performing operations the operations comprising:
controlling the electronic identification device to enter a working state from a sleep state, and obtaining to-be-displayed data; power consumption corresponding to the electronic identification device in the sleep state being lower than power consumption corresponding to the electronic identification device in the working state;
refreshing the to-be-displayed data to an electronic ink screen for display through a serial peripheral interface bus, and controlling the electronic identification device to enter the sleep state again after the refreshing is completed;
the operations further comprising:
switching to a corresponding power conversation mode according to a changed device state when a device state changes;
wherein the power conversion mode is a DC-to-DC mode when the device state is the working state, and the power coversion mode is a low dropout regulator mode when the device state is the sleep state.

\* \* \* \* \*